Jan. 9, 1934.    O. SWANSON    1,942,847
LUBRICATING DEVICE
Filed Oct. 24, 1931    2 Sheets-Sheet 1

Inventor
Olof Swanson
By Langdon Moore
Atty.

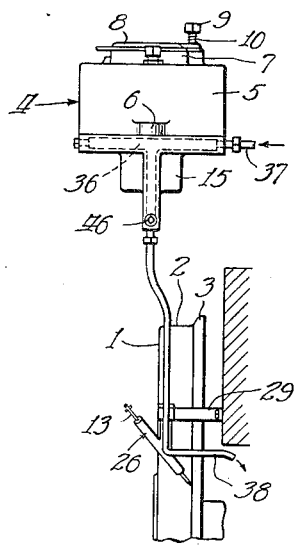
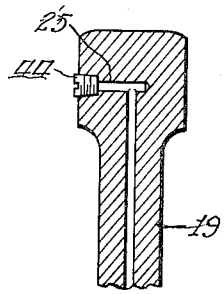
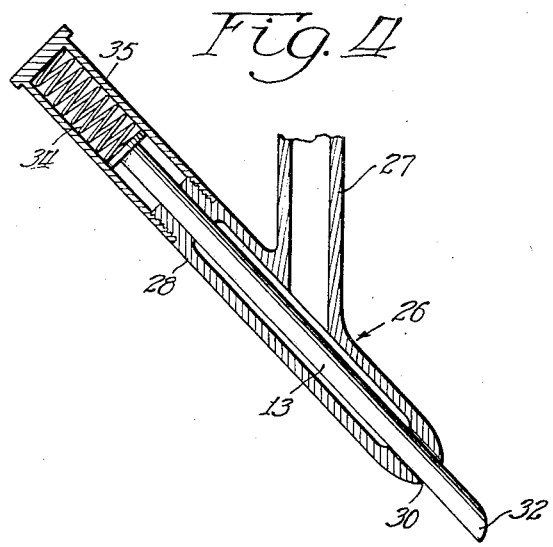

Patented Jan. 9, 1934

1,942,847

UNITED STATES PATENT OFFICE 1,942,847

LUBRICATING DEVICE

Olof Swanson, Chicago, Ill.

Application October 24, 1931. Serial No. 570,877

6 Claims. (Cl. 184—3)

The object of this invention is to provide a lubricating device for use particularly in connection with the wheel flanges of a locomotive.

Among other objects, the invention aims to provide an improved device for this purpose which is simple in construction and which is automatically actuated by vibration of the vehicle when in motion without any operating connection therefrom.

At the same time, means are provided actuated by oscillation of the vehicle for preventing obstruction of the delivery passages which frequently occurs with gravity feed devices.

The invention may be understood by reference to the illustrative embodiment thereof shown in the accompanying drawings, in which—

Figure 2 is an end elevation of the structure of Figure 1 on a reduced scale, showing the application to a wheel;

Figure 3 shows a portion of the structure of Figure 1 provided with additional control means; and Figure 4 shows a modified form of delivery finger which may be employed with the structure of Figure 1.

Figure 1:
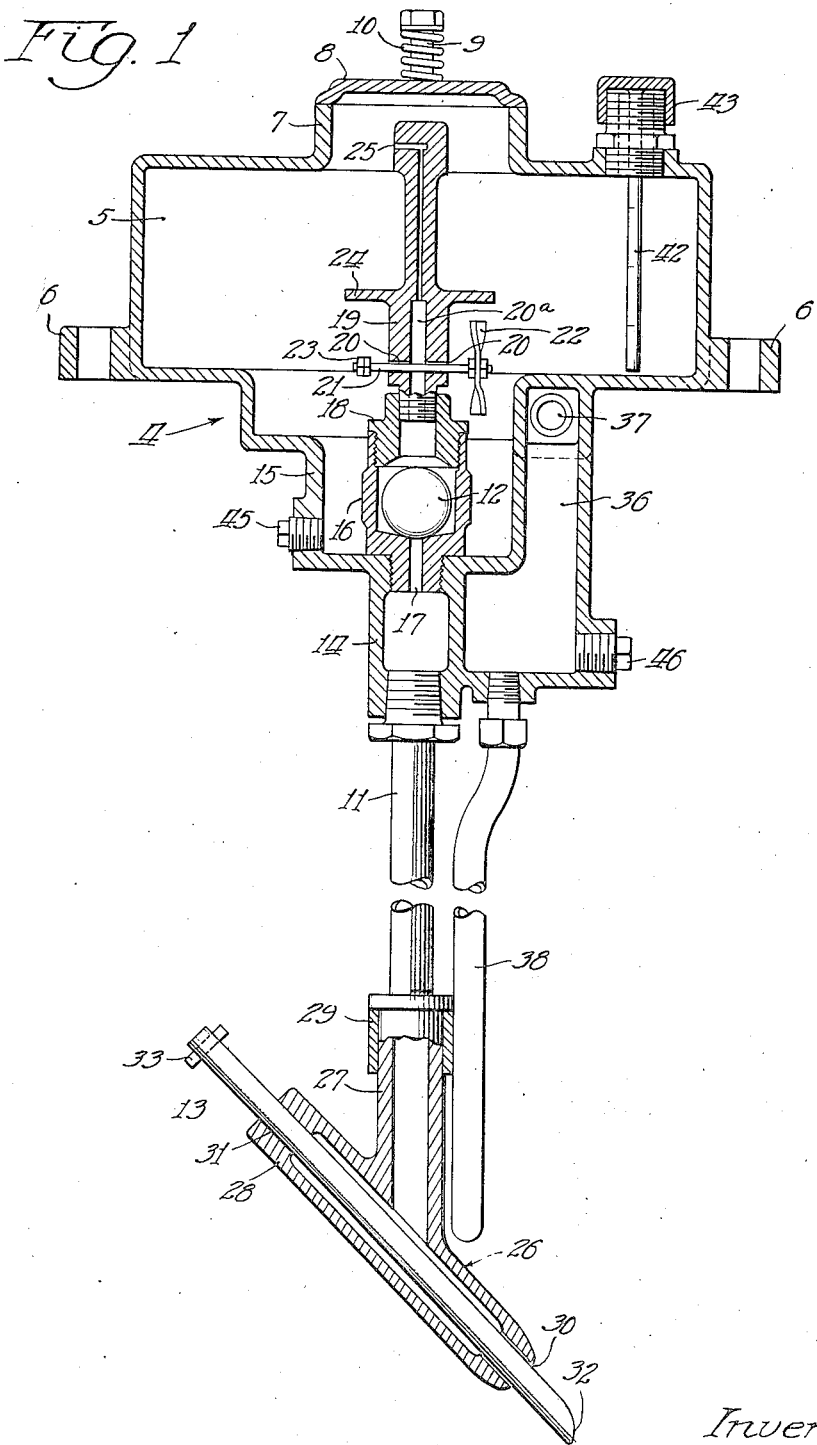
Figure 1 is an axial section of one form of the device.

Referring in detail to the figures of the drawings, I have indicated (Fig. 2) a portion of a wheel such as a locomotive driving wheel 1, having a tread 2 and a flange 3. It is desirable to prevent unnecessary noise and wear between the wheel and the rail, to have a small amount of lubrication provided on the flange of the wheel adjacent to the line where the tread and flange meet. Too much lubrication must not be deposited, however, since it might reach the tread of the wheel, which would be highly objectionable since it would tend to reduce the traction or drawing power of the locomotive.

To effect this lubrication, I have provided a device shown generally at 4 which may be secured by any suitable means to an appropriate portion of the locomotive above the wheel to be lubricated. Frequently, one such device is provided for each front and rear driving wheel.

Referring to Figure 1, in the illustrative construction the lubricating device 4 comprises an oil reservoir 5 having integral bored lugs 6 by which the device may be supported as already suggested. The reservoir 5 is desirably upwardly extended to form a cylindrical turret 7 which may be closed by a cover 8 affording access to the reservoir for purposes of filling the same and for cleaning of the parts. The cover 8 is preferably arranged to swing about a pivot bolt 9, a coil spring 10 being desirably interposed between the cover and the head of the bolt to press the cover upon the turret, thereby effecting a tight closure.

A feed pipe 11 is adapted to convey the lubricant by gravity from the reservoir 5 to the wheel 1. I provide means between the gravity feed pipe and the reservoir, in this instance the ball valve 12, which shuts off the flow of the lubricant when the locomotive is at rest and which, actuated by the vibration of the device when the locomotive is in motion, permits a small quantity of the lubricant to pass down the feed pipe to the delivery end of the pipe where the lubricant comes in contact with the delivery pencil 13, by which it is transmitted to the flange as presently described.

In the present construction, the upper or receiving end of the feed pipe 11 is coupled with the lower end of a conduit 14 which depends from the reservoir 5 and is centrally disposed with respect to the reservoir. The conduit 14 is integral with the reservoir 5 and in turn depends from a well-like depressed portion 15 also formed centrally of the reservoir 5. The opening between the depressed portion 15 and the conduit 14 is closed by the valve casing 16 which contains a valve seat for the ball valve 12, a passage 17 through the valve casing 16 being thus normally closed by the ball valve. The valve casing 16 is threaded exteriorly to screw into the upper end of the conduit 14 and is also threaded interiorly to receive the nipple 18 which, together with the inlet member 19, closes the valve casing 16. The nipple 18 is exteriorly threaded to screw into the valve casing 16 and is interiorly threaded to mate with the exterior threads upon the inlet member 19. Two passages 20 are provided in each side of the inlet member 19 through which the oil may flow by gravity into the bore 20a of the inlet member 19 and (through the nipple 18, which is in communication with both the bore 20a and the casing 16) down onto the ball 12. The two passages 20 are in register upon a straight line. As these passages must necessarily be small to prevent an excessive amount of oil from passing therethrough, and as small passages easily become clogged, I provide means for preventing obstruction of the passages 20.

In the illustrative construction, I have made the passages 20 larger than would be permissible without permitting an excessive flow of oil, but I have almost completely filled the passageways by the loosely fitting shaft 21 passing through the passages 20 and journaled therein. One end of the shaft 21 has fixed thereto the propeller 22, and the other end of the shaft may conveniently terminate in a head such as the nut 23 which prevents separation of the shaft from the inlet member 19. The shaft 21 is free, however, to move rotatively and axially in the passages 20 between the limits of the nut 23 and the hub of the propeller 22. Thus if the oil which is in the reservoir 5 is at least above the level of the shaft 21, oscillation of the device actuated by oscillation of the locomotive will cause some surging back and forth of the oil in the reservoir and this movement of the oil will in turn revolve the propeller 22 to rotate the shaft 21, or it may cause movement of the shaft axially. This ensures a slight quantity of the oil passing through the passages 20. It will be understood, of course, that it is not necessary for the shaft 21 to rotate continuously to accomplish this but that any occasional movement of the shaft either rotatively or axially will serve the purpose, which is to provide a small passageway for the lubricant with automatic means for preventing clogging of that small passage.

The inlet member 19 desirably carries the integral cross member 24 above the propeller 22 which cross member may be of rectangular shape and slightly longer than the overall dimensions of the shaft and propeller, thus acting as a guard for these parts. The inlet member is also shown extended up into the turret 7 which is above the reservoir 5, where an orifice 25 communicates with the bore 20a of the inlet member to provide for air pressure within the member. To ensure that the orifice 25 shall be open to the air in the turret 7 (thus providing an air vent between the ball valve and the air through the valve casing 16, nipple 18 and inlet member 19), the reservior 5 is not filled with oil above the lower limits of the turret 7.

As the lubricant thus admitted through the passages 20 falls upon the ball 12 and as vibration or oscillation of the locomotive moves the ball valve 12 from its seat, small quantities of the lubricant will be permitted intermittently to pass the ball valve and to drop down through the feed pipe 11.

Coupled to the lower end of the feed pipe is shown a discharge nozzle 26 which has one portion 27 providing a vertical continuation of the feed pipe and another portion 28 which is transverse to the feed pipe at an angle thereto of not more than forty-five degrees, and which has a bore intersecting the bore of the portion 27. The lower end of the feed pipe 11 may be supported on a suitable portion of the locomotive frame by a bracket 29.

The transverse portion 28 of the nozzle 26 is here shown as forming a sleeve for the delivery pencil 13 which is shown in the form of a rod passing through the sleeve 28, the pencil being spaced from the inner wall of the transverse portion 28 where the bores of the portions 27 and 28 intersect. The bore of the portion 28 is reduced, however, at each end to provide a loose sliding fit for the pencil 13, the reduced bores 30 and 31 forming bearings in which the pencil is free to rotate as well as move axially. The lower reduced bore 30 also provides a discharge orifice for the lubricant. As the delivery end 32 of the pencil contacts with the flange 3 of the wheel 1, vibration or oscillation of the wheel will cause the pencil 13 to rotate or move axially in the sleeve 28 which keeps the bore 30 from clogging. Also the lubricant, by capillary attraction, will follow the pencil from the bore 30 down to the flange of the wheel. The pencil, being free to move axially and being of substantial weight, will tend by its own weight to follow the flange of the wheel as the wheel moves toward and away from the nozzle 26. Thus I have provided means at the delivery end of the feed pipe, movable by oscillation of the wheel, for conveying lubricant from the feed pipe to the wheel and for keeping the disclarge orifice from clogging.

Generally, as already suggested, the weight of the pencil 13 will be sufficient to cause it to follow the flange, in which case the pencil may have a cross pin 33 at its upper end to prevent it from falling out of its sleeve when the device is removed from the wheel. If desired, however, additional means may be provided for causing the pencil to follow the flange, such as the compression spring 34 (Fig. 4) which may be inserted between the upper end of the pencil and the end wall of a spring barrel 35 threaded to the upper end of the pencil sleeve.

To guard against congealing of the oil in cold weather, I have provided the usual steam chamber 36 as an integral part of the reservoir member 5 but, of course, separated from the oil reservoir. A steam inlet 37 may be connected with a source of exhaust steam, for example, and a steam pipe 38 leads the steam, after it has heated the reservoir 5, along the delivery pipe 11 to keep this also warm and promote flow of the oil therethrough. The pipe 38 may be turned away from the nozzle 26 to terminate in an outlet which is offset from the wheel 1, where the condensed steam may drip out as water.

A graduated rod 42 fixed to a screw cap 43 conveniently serves as a gauge to determine the amount of oil in the reservoir.

So constructed and arranged a small predetermined amount of oil is fed into the valve casing 16. Should the locomotive stand idle for extended periods the valve casing and inlet member 19 would fill with oil up to the level of the oil in the reservoir. In that event when the ball 12 was moved an excessive amount of oil would pass down through the feed pipe and to the wheel. Under these circumstances or under any circumstances where a smaller amount of oil is desired to be fed to the wheel flange, I have provided means for closing the orifice 25, such as by the small threaded stud 44 (Fig. 3) which is adapted to be screwed into the mouth of the orifice 25. When the orifice 25 is thus closed air pressure is created in the valve casing 16 and inlet member 19 which prevents oil from passing through the passages 20 except when the ball 12 is moved off its seat.

The reservoir 5 may be conveniently provided with a drain plug 45 and the steam chamber 36 with a similar drain plug 46.

The well-like depression formed by the portion 15 advantageously provides a sediment receptacle below the passages 20 so that the passages 20 are well above any sediment which is likely to be deposited and which might otherwise clog these passages.

Having described illustrative embodiments of my invention, I claim:

1. In a lubricating device for locomotive wheels, the combination of an oil reservoir; a gravity feed pipe leading from the reservoir; a passage from the reservoir to the feed pipe; movable means in the passage for maintaining the passage open, said means being immersed in the oil in the reservoir and being responsive to oscillation of the oil in the reservoir; and a ball valve between said passage and the feed pipe responsive to vibration of the device for permitting passage of the oil through the feed pipe.

2. In a lubricating device, the combination of an oil reservoir; a gravity feed pipe leading from the reservoir; a passage for the oil from the reservoir to the feed pipe; a shaft movable rotatively and axially in said passage; and a propeller on said shaft, said propeller and shaft being movable by oscillation of the oil in the reservoir.

3. In a lubricating device for locomotive wheels, the combination of an oil reservoir; a gravity feed pipe leading from the reservoir; an inlet member between the reservoir and the feed pipe, said member having an air opening and having a restricted aperture below said opening for admitting a minute quantity of oil to the feed pipe; and a valve below said restricted aperture and responsive to vibration of the device to permit the passage of small amounts of the oil through the feed pipe.

4. In a lubricating device for locomotive wheels, the combination of an oil reservoir; a gravity feed pipe leading from the reservoir; an inlet member between the reservoir and the feed pipe, said member having an air opening and having passages below said opening for the oil to the inlet member; a shaft journaled in said passages and movable rotatively and axially therein; a propeller on said shaft, said shaft and propeller being in contact with and responsive to movement of the oil in the reservoir to keep said passage open; a ball valve between the inlet member and the feed pipe below said passages and responsive to vibrations of the device to permit small quantities of the lubricant to pass to the feed pipe; a nozzle coupled to the delivery end of the feed pipe, said nozzle having one portion providing a substantially vertical continuation of the feed pipe and another portion transverse thereto, the bores of said portions intersecting; and a rod movable axially in said transverse portion and extending on each side of said feed pipe, said rod contacting with the wheel and gravitating thereto.

5. In a lubricating device, the combination of an oil reservoir; a gravity feed pipe leading from the reservoir; an inlet member between the reservoir and the feed pipe, said member having a passage for the oil and having an air vent; means between the inlet member and feed pipe responsive to oscillation of the device for permitting the oil to pass from the inlet member to the feed-pipe; and means for closing said air vent to seal the inlet member and create air pressure therein to prevent entry of the oil into the inlet member through said passage except when the means responsive to oscillation is actuated, whereby the amount of oil fed by said device is reduced.

6. In a lubricating device, the combination with an oil reservoir; of a feed pipe leading from the reservoir; a restricted passage from the reservoir to the feed pipe; and a member loosely retained in the passage and movable by oscillations of the oil in the reservoir to frictionally maintain the passage open, said member having a portion normally immersed in the oil of the reservoir.

OLOF SWANSON.